(12) United States Patent
Gagliardi, Jr. et al.

(10) Patent No.: US 9,192,186 B1
(45) Date of Patent: Nov. 24, 2015

(54) FOOD PRODUCTS AND METHODS OF FORMING FOOD PRODUCTS

(71) Applicant: ISO CREATIVATORS, LLC, Collegeville, PA (US)

(72) Inventors: Eugene D. Gagliardi, Jr., Cochranville, PA (US); Paul Malvestuto, Haddonfield, NJ (US); Joseph P. McGonigal, Collegeville, PA (US); Victor Orsini, Glenolden, PA (US)

(73) Assignee: ISO FOOD GROUP, Collegeville, PA (US)

( * ) Notice: Subject to any disclaimer, the term of this patent is extended or adjusted under 35 U.S.C. 154(b) by 11 days.

(21) Appl. No.: 13/855,469

(22) Filed: Apr. 2, 2013

Related U.S. Application Data (60) Provisional application No. 61/619,107, filed on Apr. 2, 2012, provisional application No. 61/787,351, filed on Mar. 15, 2013.

(51) Int. Cl.
*A22C 25/00* (2006.01)
*A23L 1/315* (2006.01)
*A22C 17/00* (2006.01)

(52) U.S. Cl.
CPC ............ *A23L 1/3155* (2013.01); *A22C 17/0006* (2013.01)

(58) Field of Classification Search
USPC ......... 452/106, 132, 135–137, 149, 150, 153, 452/155–157, 164, 177, 180, 160–163
See application file for complete search history.

(56) References Cited

U.S. PATENT DOCUMENTS

| | | | | |
|---|---|---|---|---|
| 3,629,903 | A * | 12/1971 | Turner | 452/137 |
| 5,286,229 | A * | 2/1994 | Gagliardi, Jr. | 452/169 |
| 5,297,984 | A * | 3/1994 | Gagliardi, Jr. | 452/136 |
| 5,368,519 | A * | 11/1994 | Curtis et al. | 452/135 |
| 6,939,217 | B2 * | 9/2005 | Gagliardi, Jr. | 452/149 |
| 7,008,313 | B2 * | 3/2006 | Gagliardi, Jr. | 452/135 |
| 7,029,388 | B2 * | 4/2006 | Gagliardi, Jr. | 452/198 |
| 7,134,958 | B2 * | 11/2006 | Gagliardi, Jr. | 452/149 |
| 8,591,298 | B1 * | 11/2013 | Watson et al. | 452/135 |

* cited by examiner

*Primary Examiner* — Richard Price, Jr.
(74) *Attorney, Agent, or Firm* — Joseph F. Posillico (57) ABSTRACT

Disclosed is a food product formed from the leg of a fowl comprising: a) a central leg bone having a foot end and a thigh end, said leg bone preferably being substantially without at least a foot knuckle; and b) a first portion of natural meat originally located around a portion of the foot-end of said bone and displaced from said foot end toward said thigh-end such that at least a portion of said foot-end bone is exposed and such that said displaced portion of meat remains indirectly attached to the bone.

7 Claims, 9 Drawing Sheets

FOOD PRODUCTS AND METHODS OF FORMING FOOD PRODUCTS

CROSS-REFERENCE TO RELATED APPLICATIONS

This application claims the priority benefit of U.S. Provisional Application Nos. 61/619,107, filed Apr. 2, 2012, and 61/787,351, filed Mar. 15, 2013, each of which is incorporated herein by reference in its entirety.

BACKGROUND

1. Field of Invention

The present invention relates to food products and to methods of forming food products, and particularly to method of making food products from the drumstick of a bird, such as a chicken or other poultry or fowl, as well as to the resulting form of the food product.

2. Description of Related Art

Figure 1:
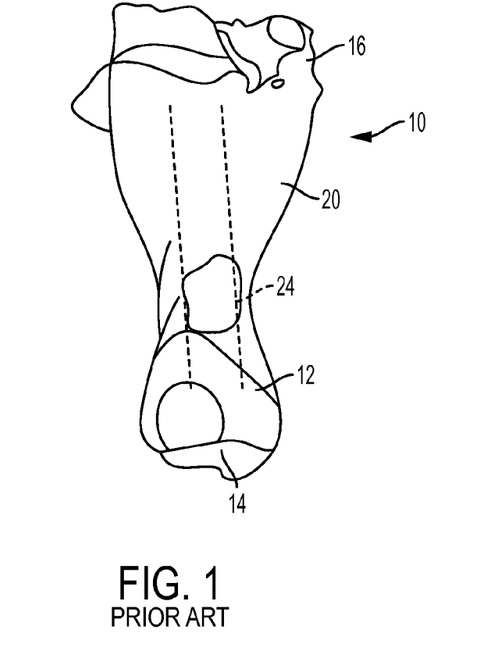
FIG. 1 is a photograph of a typical uncut chicken drumstick in accordance with the prior art.
Figure 2:
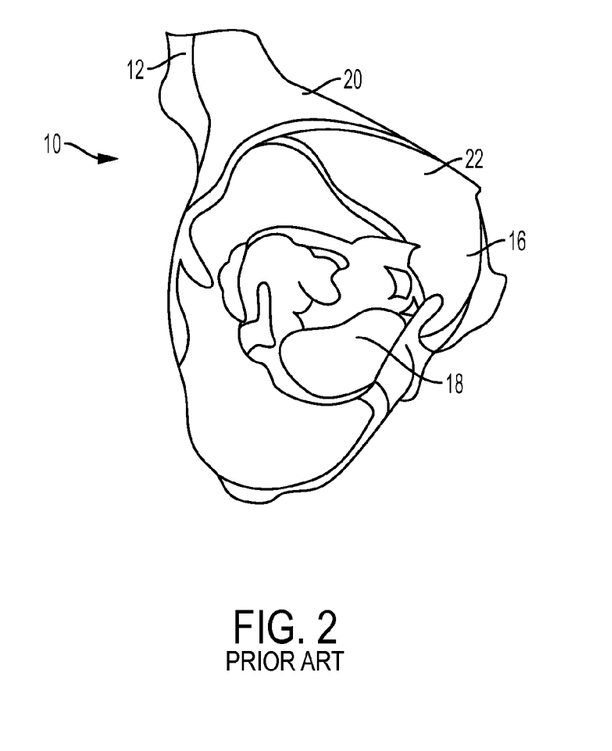
FIG. 2 is another photograph of the uncut chicken drumstick shown in FIG. 1.

Birds, such as poultry and fowl, are conventionally eviscerated, dressed, and sold either as a whole bird or as severed parts, i.e., breast, thighs, wings, etc. One of the parts which is often separated and sold is the lower portion of the leg, commonly called the drumstick, which comprises the part between the thigh and the foot of the bird. FIGS. 1 and 2 show a typical chicken drumstick 10 having a foot end 12 which includes at least a portion of the knuckle joint 14 where the drumstick 10 is attached to a foot (not shown) and a thigh end 16 which includes at least a portion of the knuckle joint 18 where the drumstick 10 is attached to a thigh (not shown). As is well known, drumsticks are generally not as commercially valuable as other parts of birds, such as breasts, thighs, and wings, due various reasons.

A method having the aim of improving the desirability of drumsticks for food consumption is disclosed in U.S. Pat. No. 5,297,984. This method involves severing at least a portion of the meat from the bone proximate the thigh end while leaving that portion of the drumstick near the foot-end attached to the bone near the foot of the bone. Although this method attempts to improve the desirability of drumsticks for human consumption, it has not been entirely successful for several reasons. Among those reasons include the recognition by applicants that drumsticks which retain the entirety of the foot knuckle, as is the case in the methods described in the '984 patent, are not entirely desirable from an aesthetic standpoint. Moreover, the display and handling of a drumstick configured in this manner is less than completely satisfactory due to the foot knuckle remaining on the drumstick. Another disadvantage of this method is that since the larger mass and better attachment of the meat to the bone is typically located surrounding the thigh end of the bone. In contrast, applicants have come to recognize that the remaining material which is attached near the foot-end is mostly skin and sinew, with relatively little meat attached to the bone in this area. As a result, applicants have come to appreciate that food products according to the '984 patent has the meat attached insufficiently strongly to the bone to create a stable and robust platform for forming improved food products. Moreover, the '984 patent neither discloses or suggests a means or mechanism for modifying the food product so as to decrease the cooking time and/or enhance the visual interest and eating experience of the food product.

SUMMARY

The present invention provides in certain preferred aspects food product formed from the leg of a fowl comprising: a) a central leg bone having a foot end and a thigh end, said leg bone preferably being substantially without at least a foot knuckle; and b) a first portion of natural meat originally located around a portion of the foot-end of said bone and displaced from said foot end toward said thigh-end such that at least a portion of said foot-end bone is exposed and such that said displaced portion of meat remains indirectly attached to the bone.

The present invention also provides in certain preferred aspects food product formed from the leg of a fowl comprising: a) a central leg bone having a foot end and a thigh end, said leg bone preferably being substantially without at least a foot knuckle or with at least a portion of the thigh knuckle removed; and b) a first portion of natural meat originally located either (i) around a portion of the foot-end of said bone and displaced from said foot end toward said thigh-end or (ii) around a portion of the thigh end of said bone and displaced from said thigh-end toward said foot-end, such that at least a portion of either said thigh-end and/or said foot-end of said bone is exposed and such that said displaced portion of meat remains indirectly attached to the thigh-end of the bone and wherein at least a portion of said displaced portion is formed into at least two lobes of meat not attached to the bone.

The present invention also provides methods of forming a food product from the leg of a fowl comprising:

(a) providing the leg of the fowl comprising a central bone having a foot-end comprising a foot knuckle and a thigh-end having a thigh knuckle and natural meat disposed substantially around said central bone;

(b) removing said foot-knuckle, at least a portion of said thigh knuckle or both;

(c) displacing a portion of said naturally occurring meet from around said central bone and toward the opposite end thereof to produce a bulbous portion comprising naturally occurring meet attached to the central bone and displaced meat from at least one of said ends; and (d) separating at least a portion of said bulbous portion into at least two separate lobes of meat attached indirectly to said central bone.

BRIEF DESCRIPTION OF THE SEVERAL VIEWS OF THE DRAWINGS

The following detailed description of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

As mentioned above, preferred product made in accordance with the present invention, especially those embodiments involving the provision of at least two lobes of meat, and preferably at least three lobes of meat, is easier and quicker to prepare and is capable of being cooked in a much shorter time than previous drumsticks.

According to further preferred aspects of the invention, the food product is more aesthetically pleasing and provides and more enjoyable eating experience because preferably the joints, including all cartilage, fat, tendons and the like are no longer present, and as a result the drumstick products are much easier to eat and more visually appealing and interesting to the consumer.

Certain terminology is used in the following description for convenience only and is not limiting. The words "right", "left", "lower" and "upper" designate directions in the Figures to which reference is made. The words "inwardly" and "outwardly" refer to directions toward and away from, respectively, the geometric center of the chicken drumstick in accordance with the present invention, and designated parts thereof. Unless specifically set forth herein, the terms "a", "an" and "the" are not limited to one element but instead should be read as meaning "at least one". The terminology includes the words noted above, derivatives thereof and words of similar import.

Referring in detail to the drawings, wherein like numerals indicate like elements throughout, there is shown in FIGS. 1 and 2 photographs of a chicken drumstick 10 which has been separated from the foot (not shown) and the thigh (not shown) of a chicken (not shown). The drumstick 10 illustrated in FIGS. 1 and 2 is from a chicken but could be from any type of fowl or poultry carcass and, therefore, the present invention is equally applicable to drumsticks obtained from all types of fowl or poultry carcasses including duck, turkey, squab, chicken, etc., both wild and domesticated. It should be clearly understood that the chicken drumstick 10 as shown in FIGS. 1 and 2 is merely for purposes of providing a point of contrast to certain aspects of the present invention, which is not limited to a chicken drumstick 10.

As discussed briefly above, the drumstick 10 as shown in FIGS. 1 and 2 includes a foot end 12 which includes at least a portion of a foot knuckle joint 14 and a thigh end 16 which includes at least a portion of a thigh knuckle joint 18. As used herein, the term "foot end" refers to the portion of the central bone from the terminal edge of the foot knuckle, or the edge of the bone from which the foot knuckle had been separated, to about the middle of the bone. As used herein, the term "thigh end" refers to the portion of the central bone from the terminal edge of the thigh knuckle or portion thereof, or the edge of the bone from which the foot knuckle portion had been separated, to about the middle of the bone.

In certain embodiments of the present invention, the drumstick 10 also includes a layer of skin 20 which surrounds and contains drumstick meat 22 and sinew, cartilage and the like. It will be appreciated that the present invention is also applicable with respect to a "skinless" drumstick (not shown). The meat 22, typically referred to as "dark" meat, surrounds and is also attached o a single elongated central bone 24 which extends between and is connected to each of the knuckle joints 14, 18. As is well known in the art, the areas of the drumstick 10 around and proximate to the knuckle joints 14, 18, in addition to containing meat 22, may also contain cartilage, veins, ligaments, fat and similar components.

The foregoing description relates to the features of a typical bird or chicken drumstick 10. It will be appreciated by those skilled in the art that the size, configuration, amount of meat, thickness and location of the skin, size of the knuckle joints, as well as various other features and attributes of the drumstick 10 may vary from drumstick to drumstick and are not intended to be a limitation on the present invention as described below. As indicated above, the present invention is equally applicable to all types of bird drumsticks having virtually any configuration, size, etc In certain preferred embodiments of the method aspects of the present invention, a drumstick, and preferable a chicken drumstick 10, is provided. Preferably at least one of the knuckle joints 14 and 18 is at least partially removed, preferably by cutting using any of the techniques common and known to those skilled in the are. Preferably, the foot knuckle joint is removed substantially entirely, and at least a sufficient portion of the thigh knuckle joint is removed to provide a relatively more stable base to the drumstick such that the drumstick can be made to readily stand substantially upright on the thigh end once a food product is formed in accordance with the present invention.

Figure 3:
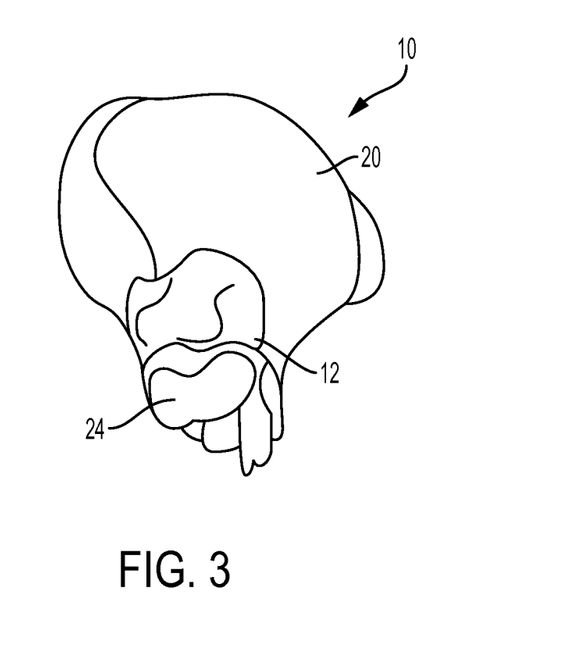
FIG. 3 is a photograph illustrating the drumstick of FIG. 1 after the removal of the foot joint in accordance with the method of the present invention.

According to certain preferred method aspects of the foot knuckle joint 14 is substantially entirely removed, preferably along with at least a portion of and preferably substantially all associated cartilage, fat, tendons, skin and other inedible components connected to, associated with or located proximate to the foot knuckle joint 14. Preferably the foot knuckle joint 14 and the inedible components are all removed at the same time making a single cut by a standard poultry saw (not shown) of a type well known in the art, preferably using a standard, known poultry blade (not shown). It will be appreciated by those skilled in the art that some other kind of saw, a knife or any other suitable cutting instrument, including a specially developed tool may alternatively be used to remove the foot knuckle joint 14 and the inedible components. FIG. 3 is a photograph of the drumstick 10 after the removal of the foot knuckle joint 14 and the inedible components. As shown in FIG. 3 the remaining bone 24, meat, 22 and skin 20 are exposed at the foot end 12.

After the foot knuckle joint 14 has been substantially removed, the methods preferably comprise displacing at least a portion, and preferably a substantial portion, and even more preferably the entire portion of the meat attached to and/or surrounding the foot end of the central bone towards the thigh end, such that at least a portion of the foot end of the central bone is exposed. The displacing step preferably comprises disconnecting the appropriate portions of the meet from the corresponding portions of the central bone, preferably by tearing the meat from the bone by downward stress at the meat/bone interface.

Figure 5:
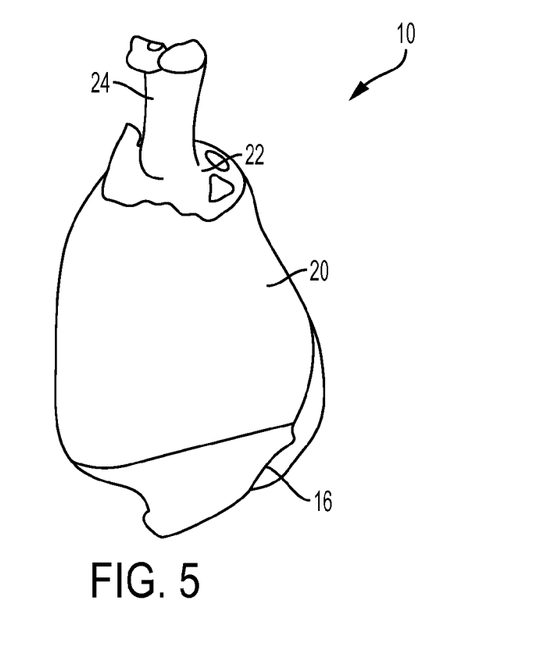
FIG. 5 is a photograph illustrating the drumstick of FIG. 4 in a standing orientation with the foot end of the drumstick facing up.
Figure 6:
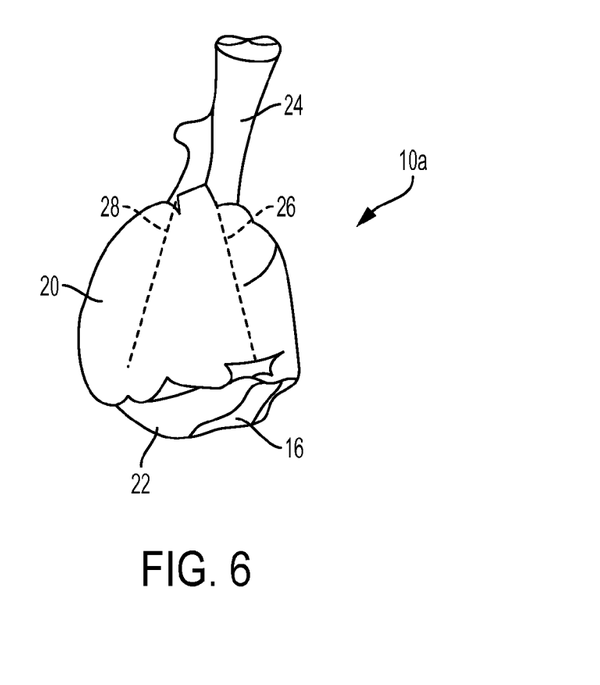
FIG. 6 is a photograph illustrating the drumstick of FIG. 5 after the meat has been pushed from the foot end toward the thigh end in accordance with the method of the present invention to produce a first drumstick product.

With particular reference to the Figures, after the foot knuckle joint 14 has been substantially removed, at least a portion the remaining drumstick 10 is vertically oriented so that the thigh end 16 is facing down and the foot end 12 is facing up as shown in FIG. 5. At least a portion of the meat 22 and skin 20 remaining on the foot-end of the bone 24 are displaced downward by pushing downwardly along the bone 24 toward the thigh end 16 so that all of the remaining the meat 22 and skin 20 are concentrated on the bone 24 proximate to the thigh end 16 and a substantial portion of the bone 24 is exposed and extends upwardly as shown in FIG. 6. It will be appreciated that in certain embodiments, substantially all of the meat and skin on the foot end is displaced and further that a portion of the meet and skin on the thigh end is also displaced so as to expose not only the entire foot end of the central bone but also a portion of the thigh end of the central bone. The meat 22 and skin 20 may be pushed downwardly along the bone 24 toward the thigh end 16 by hand or buy using a knife, tool or other implement (not shown) or in any other suitable manner.

Figure 11:
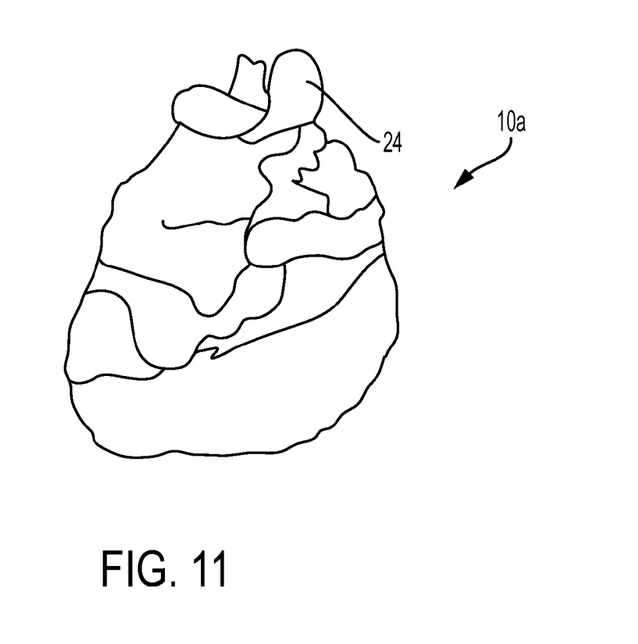
FIG. 11 is a photograph of the first drumstick product of FIG. 6 after cooking.

Accordingly, on product of the invention a drumstick product 10a which has the appearance of a Drumstick Osso Bucco as shown in FIG. 6. The Drumstick Osso Bucco can be conveniently prepared for consumption by oven roasting, grilling or in any other conventional manner. FIG. 11 illustrates the first drumstick product 10a after cooking.

Figure 4:
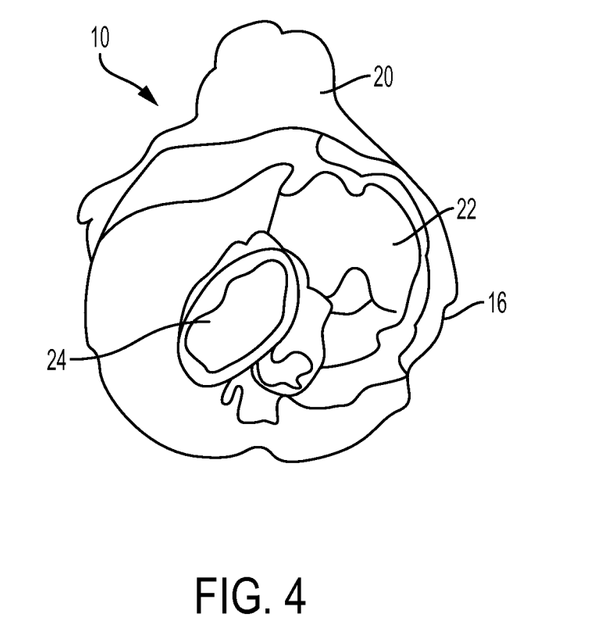
FIG. 4 is a photograph of the drumstick of FIG. 3 after the removal of the thigh joint in accordance with the method of the present invention.

In certain preferred aspects, the method optionally but preferably further comprises, prior to said displacing step (which is illustrated in the Figures), removing at least a portion of the thigh knuckle joint 18, preferably together with all associated cartilage, fat, tendons, skin and other inedible components connected to, associated with or located proximate to the removed portion of the thigh knuckle joint 18. Preferably the thigh knuckle joint 18 and the inedible components are all removed at the same time making a single cut by a standard poultry saw (not shown) of a type well known in the art, preferably using a standard, known poultry blade (not shown). It will be appreciated by those skilled in the art that some other kind of saw, a knife or any other suitable cutting instrument, including a specially developed tool may alternatively be used to remove the thigh knuckle joint 18 and the inedible components. FIG. 4 is a photograph of the drumstick 10 of FIG. 3 after the removal of the thigh knuckle joint 18 and the inedible components. As shown in FIG. 4 the remaining bone 24, meat, 22 and skin 20 are exposed at the thigh end 16.

Figure 7:
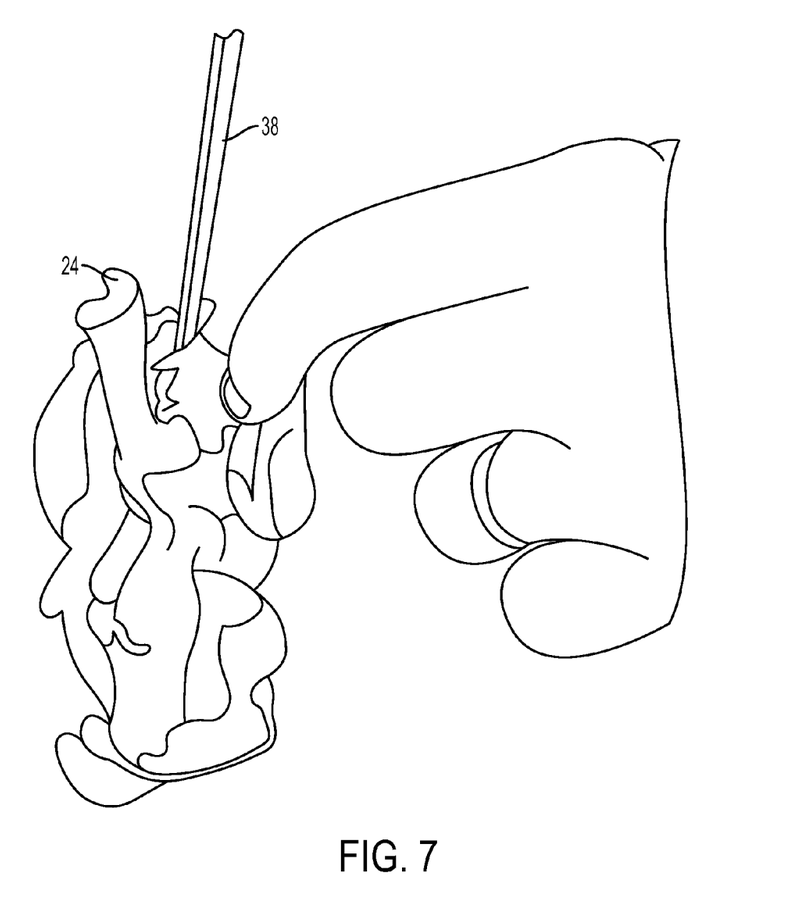
FIG. 7 is a photograph illustrating the drumstick meat of FIG. 6 being cut laterally into three lobes in accordance with the method of the present invention.
Figure 8:
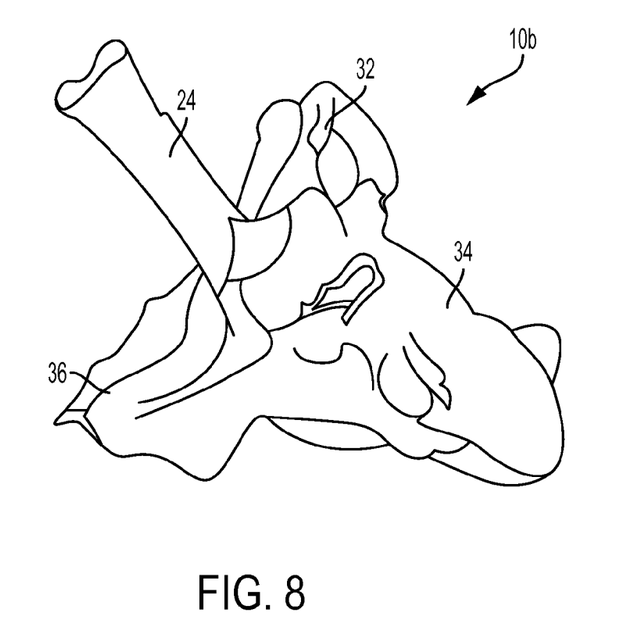
FIG. 8 is a photograph illustrating the drumstick meat of FIG. 6 after having been cut into three lobes in accordance with the method of the present invention to produce a second drumstick product.
Figure 9:
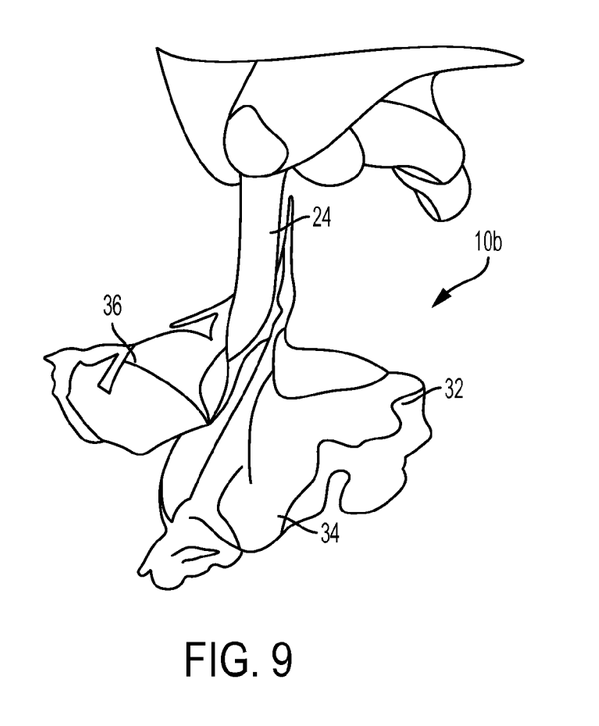
FIG. 9 is a photograph illustrating the drumstick product of FIG. 8 being conveniently held by a consumer.

According to further aspects of the invention, the methods comprise cutting the meat 22 and skin 20 remaining on the bone 24 which is concentrated proximate to the thigh end 12 into two or more individual meat lobes. As best shown in FIGS. 6 through 9, in the preferred embodiment, the remaining meat 22 and skin 20 are cut along three circumferentially spaced cut lines (only two 26, 28, being shown in FIG. 6) into three generally equally sized lobes 32, 34 and 36 (FIGS. 8 and 9). Preferably the cuts which are generally equally circumferentially spaced around the bone 24, are made generally radially from the outer surface of the skin 20 through the meat 22 and to the bone 24 beginning from the foot end 12 and extending downwardly toward, but not completely to, the thigh end 16. In this manner a small portion of the meat 22 and skin 20 proximate to the thigh end 12 remains attached to the bone 24 as shown in FIGS. 8 and 9 to create a drumstick product, one embodiment of which is illustrated in FIG. 10b. The uncut meat portion is preferably at least ⅛ of an inch thick but more preferably is in the range of ¼-1 inch. The thickness of the uncut portion preferably is of a thickness which is capable of maintaining the uncut bone end of each of the drumstick lobes 32, 34, 36 attached to the bone 24 for supporting the lobes 32, 34, 36 when the drumstick product 10b can be conveniently held by the exposed portion of the bone 24 as shown in FIG. 9. The cuts may be made using a knife 38 as shown in FIG. 7, a saw, water knife or any other suitable cutting instrument or device including a specially developed implement (not shown). Although in the preferred embodiment three cuts are made to provide three drumstick lobes 32, 34, 36, it will be understood by those skilled in the art that a lesser number of cuts, such as two cuts or a greater number of cuts such as four, five or six cuts may alternatively be made to provide a lesser or greater number of drumstick lobes. The size (amount of meat) of the drumstick lobes will vary depending on the amount of meat 22 and skin 20 which is present on the drumstick 10 and depending on the number of cuts being made. For example, a drumstick with a greater amount of meat 22 may be cut into four, five or even six lobes while a drumstick with a lesser amount of meat 22 may be cut into three (as shown) or even two lobes. Preferably the number of cuts is selected to provide lobes which are of a generally uniform size and which may be consumed in a single bite or a small number of bites.

Figure 12:
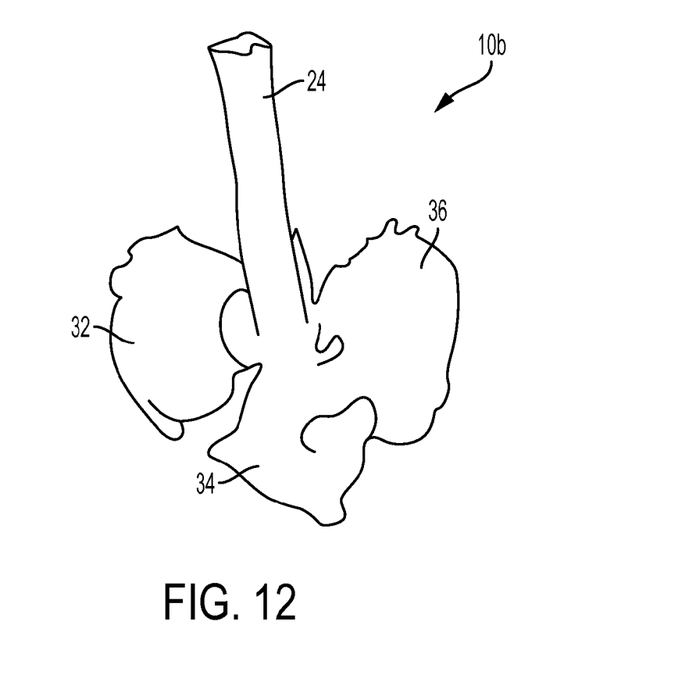
FIG. 12 is a photograph of the second drumstick product of FIG. 8 after cooking.

A further drumstick product 10b may be prepared by being breaded or battered and deep fat fried or in some other know manner. As shown in FIG. 9, the second drumstick product 10b may be conveniently picked up and held by a consumer gripping the exposed part of the bone 24 as shown for sequentially dipping and consuming the lobes 32, 34, 36, one at a time, into a sauce, such as a hot wing sauce, honey mustard sauce or other dip (not shown). FIG. 12 shows the second drumstick product 10b after cooking.

Figure 10:
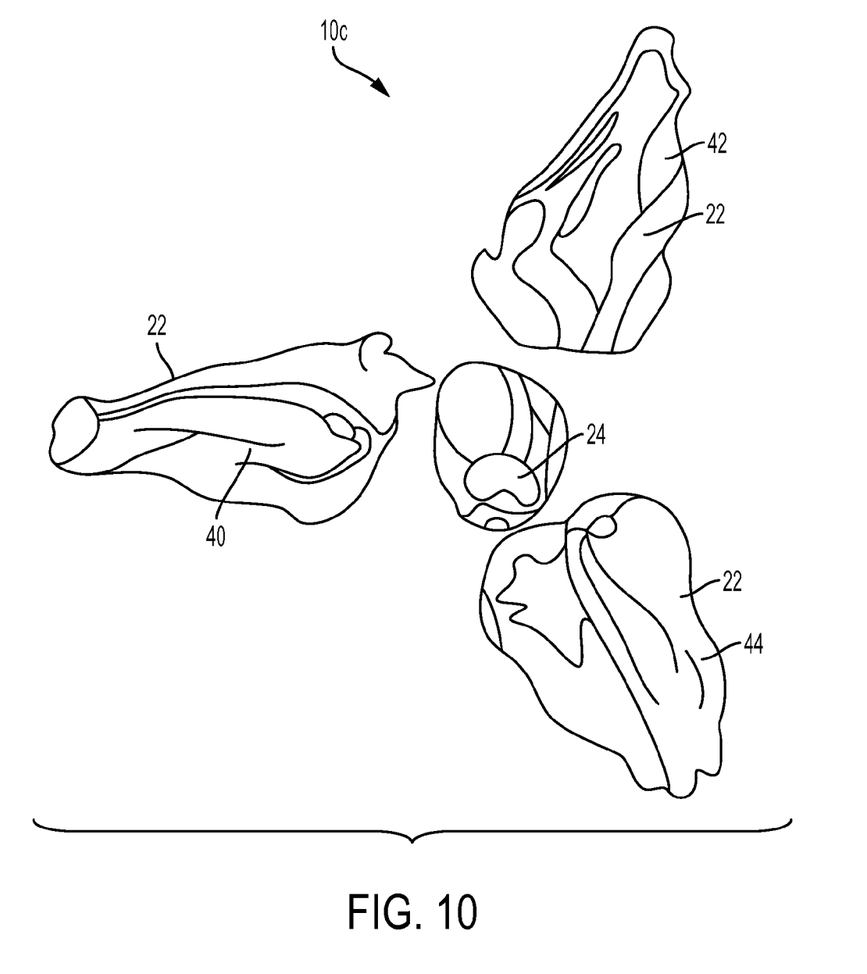
FIG. 10 is a photograph illustrating the three lobes of the drumstick product of FIG. 8 after being completely removed from the bone in accordance with the method of the present invention to produce a third drumstick product.

In a further embodiment, a yet further drumstick product 10c may be made by cutting the meat 22 and skin 20 as described above in connection with the drumstick product 10b but extending the cuts the entire length of the bone 24 (i.e. leaving no uncut portion proximate to the thigh end 16) so that the three lobes 40, 42, 44 are completely removed from the bone 24 as shown in FIG. 10. The three separated lobes 40, 42, 44 comprise boneless drumstick meat 22 and skin 20 that can be completely consumed. Alternatively, the skin 20 may be removed at any time before, during or after the above described steps to provide boneless, skinless drumstick meat products 10c. The drumstick products 10a may be prepared/cooked in any desired manner, such as breading/battering and frying and may be served with a suitable sauce or other dip, such as a barbeque or honey mustard sauce.

Figure 13:
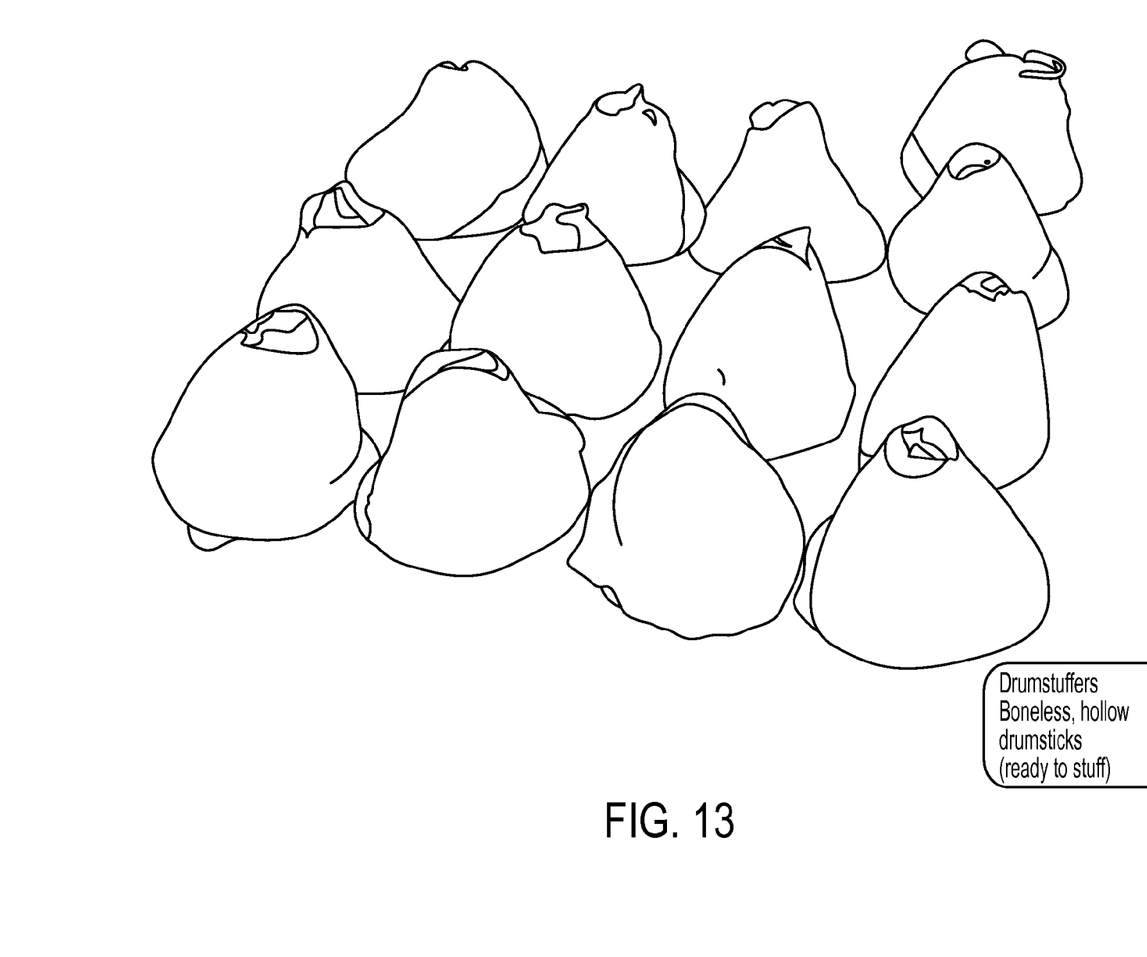
FIG. 13 is a photograph of an aspect of the present invention in which the central bone has been completely removed, for example from the embodiments as shown in FIGS. 5 and 6, and illustrates a further aspect of the invention including an ornamental design for a food product as shown and described by the common elements in each of the several embodiments shown therein.
Figure 14:
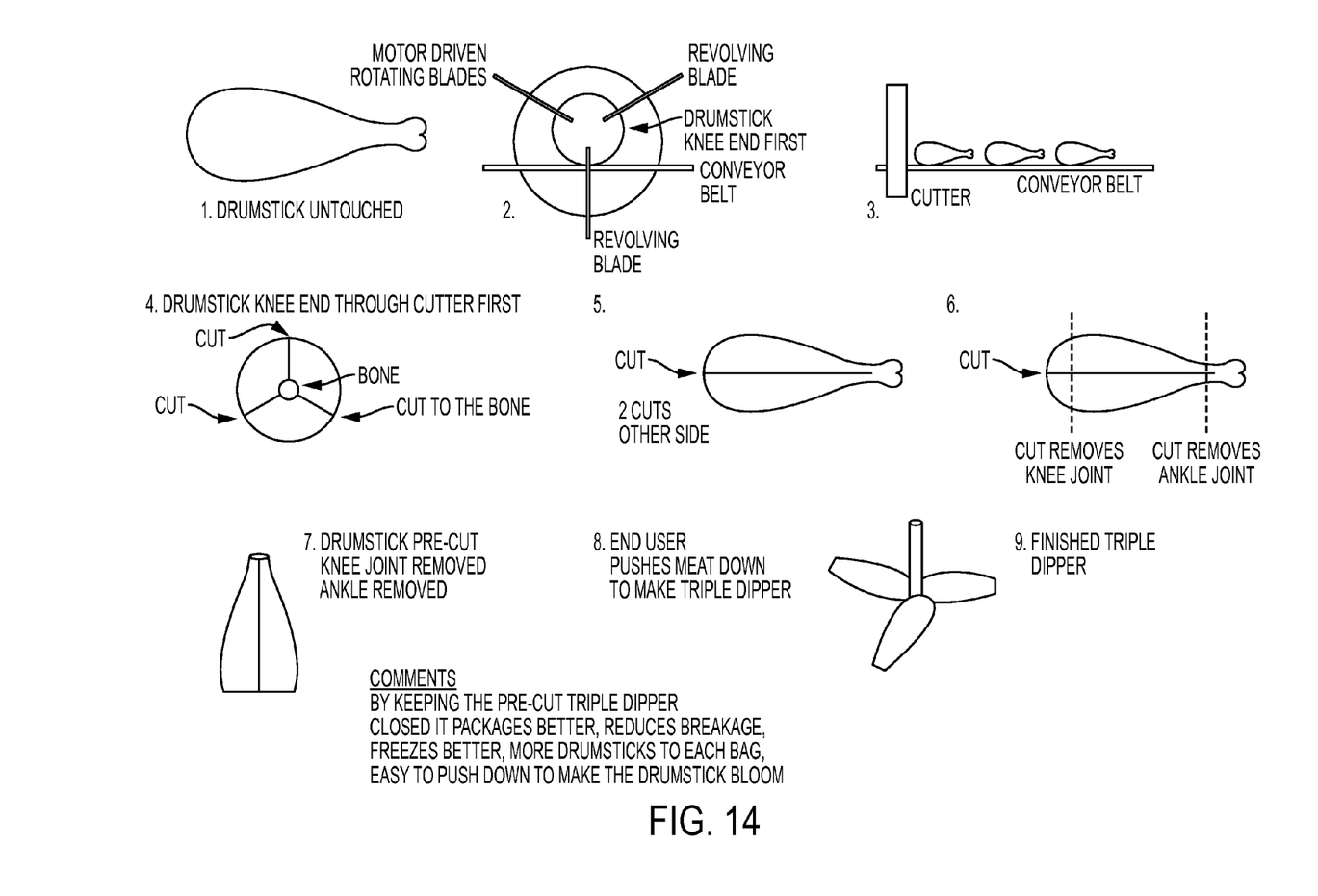
FIG. 14 is a set of 9 schematic drawings and associated descriptions showing a preferred embodiment of the method and product aspects of the invention.

In certain embodiments, as illustrated in FIG. 13, a boneless product is formed by fully separating the meat from the bone, preferably by pushing the bone fully through the bulbous meat portion created according to preferred aspects of the invention, to form a boneless product having an unique and desirably ornamental appearance.

It will be apparent to those skilled in the art that automated processes/equipment may be employed to perform any or all of the above described cutting steps either individually, sequentially or simultaneously. The removed joints 14, 18 and associated inedible components (which include some meat) may be disposed of, further processed, or are preferably used to prepare chicken stock or soup.

From the foregoing description, it can be seen that the present invention comprises a new and useful method of making three different products from the drumstick of a bird as well as the products made in accordance with the method. The present method is relatively quick, easy and reproducible to employ in connection with the preparation of drumsticks and the resulting drumstick products are more desirable than the full sized drumsticks which were available with the prior art. It will be recognized by those skilled in the art that changes could be made to the above-described embodiments of the invention without departing from the broad inventive concepts thereof. For example, the drumstick may be skinless or the order in which the steps are performed may be altered. It is understood, therefore, that this invention is not limited to the particular embodiment disclosed above, but is intended to cover all modifications which are within the spirit and scope of the invention.

What is claimed is:

1. A method of forming a food product from the leg of a fowl comprising:
    (a) providing the leg of the fowl comprising a central bone having a foot-end comprising a foot knuckle and a thigh-end having a thigh knuckle and natural meat disposed substantially around said central bone;
    (b) removing said foot-knuckle, said thigh knuckle or both;
    (c) displacing a portion of said naturally occurring meet from around said central bone and toward the opposite end thereof to produce a bulbous portion comprising: (i) naturally occurring meet attached directly to the central bone and (ii) displaced meat from at least one of said ends and indirectly attached to the bone; and
    (d) separating at least a portion of said bulbous portion into at least two separate lobes of meat attached indirectly to said central bone.

2. The method of forming a food product of claim 1 wherein said separated lobes are maintained in close proximity to one another.

3. The method of forming a food product of claim 1 wherein said separated lobes are maintained in close proximity to one another and then packaged for transportation and/or sale to form a packages food product.

4. The method of forming a food product of claim 3 wherein the lobes of said packaged food product are substantially separated from one another after said packaging step.

5. The method of forming a food product of claim 3 wherein said packaged lobes are substantially separated from one another and then cooked.

6. The method of forming a food product of claim 3 wherein said packaged lobes are substantially separated from one another by cooking.

7. A method of forming a food product from the leg of a fowl comprising:
    (a) providing the leg of the fowl comprising a central bone having a foot-end comprising a foot knuckle and a thigh-end having a thigh knuckle and natural meat disposed substantially around said central bone;
    (b) removing at least said foot-knuckle;
    (c) displacing a portion of said naturally occurring meet from around the foot end of said central bone toward the thigh end of said central bone to produce a bulbous portion comprising naturally occurring meet indirectly attached to the central bone and exposing at least a portion of said foot end.

\* \* \* \* \*